US012372217B2

(12) United States Patent
Yu et al.

(10) Patent No.: US 12,372,217 B2
(45) Date of Patent: Jul. 29, 2025

(54) ILLUMINATION MODULE

(71) Applicant: Qisda Corporation, Taoyuan (TW)

(72) Inventors: Chao-Shun Yu, Taoyuan (TW); Cheng-Chieh Juan, Taoyuan (TW); Wen-Chang Chen, Taoyuan (TW); Chun-Sheng Hu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 18/938,210

(22) Filed: Nov. 5, 2024

(65) Prior Publication Data

US 2025/0146643 A1 May 8, 2025

(30) Foreign Application Priority Data

Nov. 8, 2023 (TW) ................................ 112143050

(51) Int. Cl.
*F21S 41/675* (2018.01)
*F21S 41/25* (2018.01)

(52) U.S. Cl.
CPC ............. *F21S 41/675* (2018.01); *F21S 41/25* (2018.01)

(58) Field of Classification Search
CPC ...... F21S 41/675; F21S 41/125; F21S 41/285; F21S 41/36; F21V 9/20
See application file for complete search history.

(56) References Cited

U.S. PATENT DOCUMENTS

| | | | |
|---|---|---|---|
| 2003/0098349 A1 | 5/2003 | Tsikos et al. |
| 2007/0012777 A1 | 1/2007 | Tsikos et al. |

FOREIGN PATENT DOCUMENTS

| | | |
|---|---|---|
| CN | 115362084 | 11/2022 |
| CN | 115711370 | 2/2023 |
| TW | 201803751 | 2/2018 |
| TW | 201930960 | 8/2019 |
| TW | 202131082 | 8/2021 |

*Primary Examiner* — Elmito Breval

(57) ABSTRACT

An illumination module includes a light source configured to emit an illumination light beam, a reflective light valve disposed on a path of the illumination light beam and configured to form a plurality of pixels, a lens, and an image sensing module. Each pixel is adapted to be switched between a first state and a second state. The pixels in the first state among the pixels are configured to reflect the illumination light beam into an effective light beam. The pixels in the second state among the pixels are configured to reflect the illumination light beam into a complementary light beam. The lens is disposed on a path of the effective light beam and configured to project the effective light beam to an area to be illuminated. The image sensing module is disposed on a path of a complementary light beam from the reflective light valve and configured to sense the complementary light beam.

20 Claims, 7 Drawing Sheets

ILLUMINATION MODULE

CROSS-REFERENCE TO RELATED APPLICATION

This application claims the priority benefit of Taiwan application serial no. 112143050, filed on Nov. 8, 2023. The entirety of the above-mentioned patent application is hereby incorporated by reference herein and made a part of this specification.

BACKGROUND

Technical Field

The disclosure relates to an optical module, and particularly relates to an illumination module.

Description of Related Art

With the advancement of optoelectronic technology, an adaptive driving beam (ADB) has been developed in the field of automotive headlight illumination. When the vehicle-mounted camera senses an oncoming or approaching vehicle or pedestrian, the adaptive driving beam can automatically adjust the light, dimming each light source in the car light or moving the light beam downward and sideways. In this way, the car driver can always turn on the high beam to provide the best illumination, and the adaptive driving beam will automatically adjust the light beam so as not to illuminate the oncoming driver.

Currently, the adaptive driving beam is already under operation using a digital micro-mirror device (DMD) system. When this kind of adaptive driving beam is used and the vehicle-mounted camera senses an oncoming vehicle, a plurality of micro-mirrors of the digital micro-mirror device corresponding to the area of the oncoming vehicle turns so that the high beam does not illuminate the oncoming vehicle.

However, any electronic device may malfunction. When the digital micro-mirror operates abnormally, it may cause the high beam that should not be directed at the oncoming vehicle to be directed at the oncoming vehicle, causing a driving hazard and thereby causing the adaptive driving beam to lose its function.

On the other hand, when the digital micro-mirror device is used in a projection device, the projection device may project an erroneous image frame due to an abnormal operation of the digital micro-mirror device.

SUMMARY

The disclosure provides an illumination module that can self-determine whether it is operating normally.

An embodiment of the disclosure provides an illumination module, including a light source, a reflective light valve, a lens, an image sensing module, and a controller. The light source is configured to emit an illumination light beam. The reflective light valve is disposed on a path of the illumination light beam and configured to form a plurality of pixels. Each pixel is adapted to be switched between a first state and a second state. The pixels in the first state among the pixels are configured to reflect the illumination light beam into an effective light beam, and the pixels in the second state among the pixels are configured to reflect the illumination light beam into a complementary light beam. The lens is disposed on a path of the effective light beam and configured to project the effective light beam to an area to be illuminated. The image sensing module is disposed on a path of the complementary light beam from the reflective light valve and configured to sense the complementary light beam and convert an image formed by the sensed complementary light beam into a sensing signal. The controller is electrically connected to the reflective light valve and the image sensing module. The controller is configured to provide an image signal to the reflective light valve to control a distribution of the first state and the second state of the pixels, and the controller is configured to determine whether the reflective light valve is operating normally by comparing the sensing signal and the image signal.

In the illumination module of the embodiment of the disclosure, the controller determines whether the reflective light valve is operating normally by comparing the sensing signal corresponding to the complementary light beam and the image signal. Therefore, the illumination module of the embodiment of the disclosure can self-determine whether it is operating normally.

DESCRIPTION OF THE EMBODIMENTS

Figure 1:
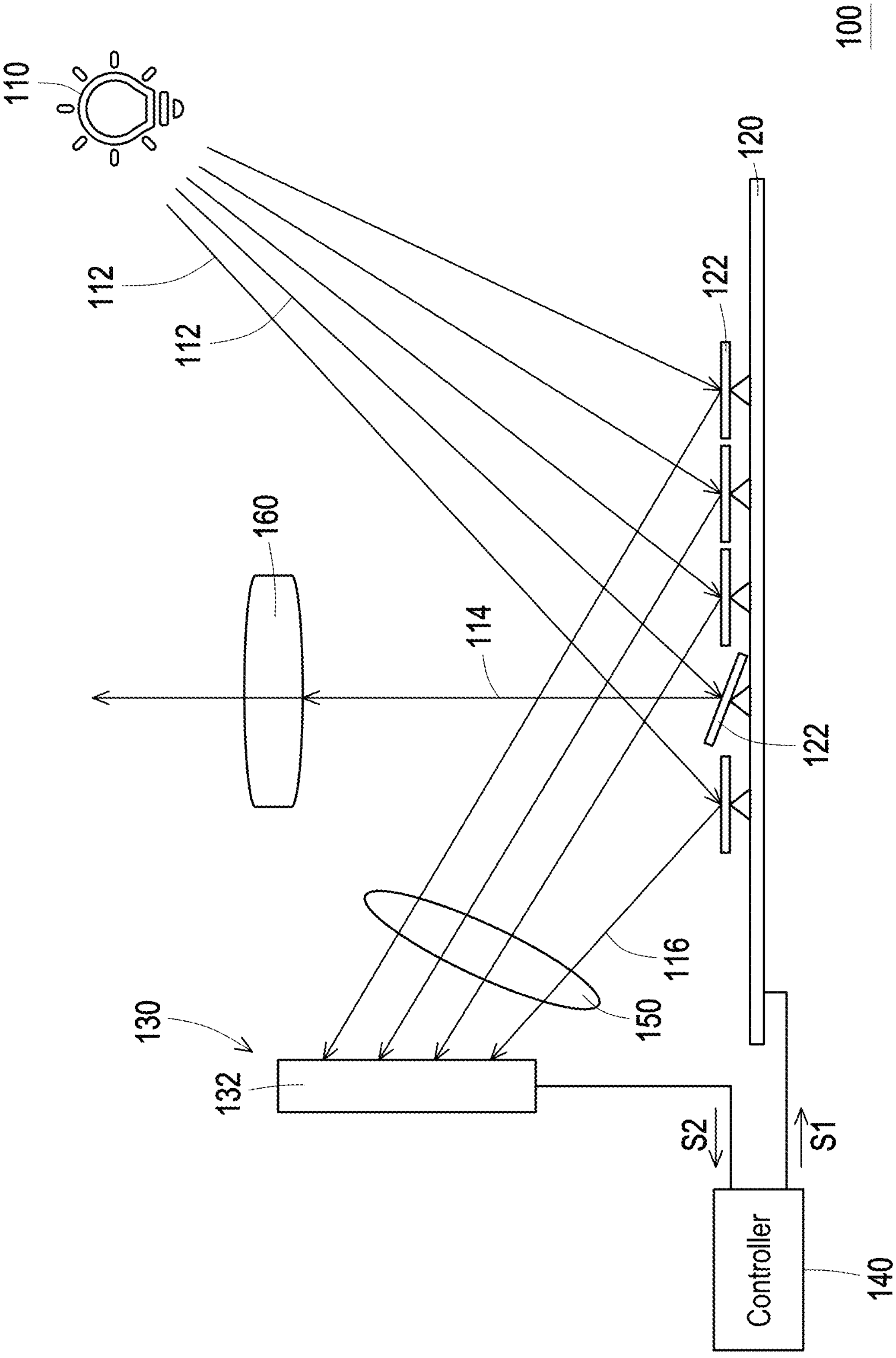
FIG. 1 is a schematic diagram of a light path of an illumination module according to an embodiment of the disclosure.

FIG. 1 is a schematic diagram of a light path of an illumination module according to an embodiment of the disclosure. Referring to FIG. 1, an illumination module 100 of the embodiment includes a light source 110, a reflective light valve 120, a lens 160, an image sensing module 130, and a controller 140. The light source 110 is configured to emit an illumination light beam 112. In the embodiment, the light source 110 includes at least one of a light-emitting diode, a laser diode, and a gas discharge lamp, where the gas discharge lamp may be a high-intensity discharge lamp (HID lamp). The reflective light valve 120 is disposed on a path of the illumination light beam 112 and configured to form a plurality of pixels 122. In FIG. 1, 5 pixels are shown as an example, but in fact, there can be more pixels 122. These pixels 122 can form an image frame. For example, these pixels 122 can be arrayed into an array (e.g., a two-dimensional array) to form the image frame.

Each pixel 122 is adapted to be switched between a first state and a second state. The pixels 122 in the first state among the pixels 122 (for example, the second pixel 122 from the left in FIG. 1) are configured to reflect the illumination light beam 112 into an effective light beam 114, and the pixels 122 in the second state among the pixels 122 (such as other pixels 122 in FIG. 1) are configured to reflect the illumination light beam 112 into a complementary light beam 116. The lens 160 is disposed on a path of the effective light beam 114 and configured to project the effective light beam 114 to an area to be illuminated. The image sensing module 130 is disposed on a path of the complementary light beam from the reflective light valve and configured to sense the complementary light beam and convert the image formed by the sensed complementary light beam into a sensing signal S2.

In the embodiment, the reflective light valve 120 is a digital micro-mirror device (DMD), and the pixels 122 are a plurality of micro-mirrors. A pixel 122 in the first state represents that the micro-mirror of this pixel 122 rotates to a first angle (e.g., the second pixel 122 from the left in FIG. 1) to reflect the illumination light beam 112 irradiated thereon to the lens 160. Another pixel 122 in the second state represents that the micro-mirror of another pixel 122 rotates to a second angle (e.g., other pixels 122 in FIG. 1) to reflect the illumination light beam 112 irradiated thereon to the image sensing module 130.

The controller 140 is electrically connected to the reflective light valve 120 and the image sensing module 130. The controller 140 is configured to provide an image signal S1 to the reflective light valve 120 to control a distribution of the first state and the second state of the pixels 122, and the controller is configured to determine whether the reflective light valve 120 is operating normally by comparing the sensing signal S2 and the image signal S1.

Specifically, when the reflective light valve 120 is operating normally, an image of the effective light beam 114 generated after the reflective light valve 120 receives the image signal S1 (i.e., the image formed by the pixels 122 being switched to the first state) and an image of the complementary light beam 116 detected by the image sensing module 130 that is represented by the sensing signal S2 are negative images of each other (i.e., complementary images). Therefore, when the controller 140 determines that the image represented by the image signal S1 and the image represented by the sensing signal S2 are negative images of each other, the controller 140 can determine that the reflective light valve 120 is operating normally.

When the reflective light valve 120 is operating abnormally, the image formed by the pixels 122 being switched to the first state will be different from the image represented by the image signal S1. In this way, the image of the complementary light beam and the image represented by the image signal S1 will not be negative images of each other. Therefore, when the controller 140 determines that the image represented by the image signal S1 and the image represented by the sensing signal S2 are not negative images of each other, the controller 140 can determine that the reflective light valve 120 is not operating normally.

In the embodiment, the controller 140 is configured to compare each first pixel data of the sensing signal S2 and each second pixel data of the image signal S2. The controller 140 is configured to determine that the reflective light valve 120 is operating normally in response to the first pixel data and the second pixel data at a same pixel position showing complementary grayscales. The controller 140 is configured to determine that the reflective light valve 120 is not operating normally in response to the first pixel data and the second pixel data located at a same pixel position not showing complementary grayscales. Through such a determination method, the controller 140 can determine whether the image represented by the image signal S1 and the image represented by the sensing signal S2 are negative images of each other (i.e., complementary images) as described above, and then determine whether the reflective light valve 120 is operating normally.

In the illumination module 100 of the embodiment, the controller 140 determines whether the reflective light valve 120 is operating normally by comparing the sensing signal S2 corresponding to the complementary light beam 116 and the image signal S1. Therefore, the illumination module 100 of the embodiment can self-determine whether it is operating normally, thereby preventing the illumination module 100 from projecting the effective light beam 114 with a light distribution error. In the embodiment, the illumination module 100 is, for example, an automotive headlight. Therefore, by allowing the illumination module 100 to self-determine whether it is operating normally, the illumination module 100 can be prevented from projecting the effective light beam 114 with a light distribution error. For example, high beams can be effectively prevented from being erroneously projected onto oncoming vehicles, thereby effectively improving driving safety.

In another embodiment, the illumination module 100 is, for example, a projector. Therefore, by allowing the illumination module 100 to self-determine whether it is operating normally, the illumination module 100 can be prevented from projecting the effective light beam 114 with a light distribution error. That is, the illumination module can be effectively prevented from providing an erroneous image frame.

In the embodiment, the image sensing module 130 is an image sensor 132, such as a complementary metal oxide semiconductor (CMOS) image sensor or a charge coupled device (CCD). In addition, in the embodiment, the illumination module 100 may include a lens group 150 disposed between the reflective light valve 120 and the image sensing module 130. In addition, in the embodiment, the lens group 150 includes at least one of a lens, a beam splitter, and a light reducing mirror, where the lens can help image the complementary light beam 116 on the image sensor 132, and the beam splitter or light reducing mirror can reduce the light intensity of the complementary light beam 116 irradiating the image sensor 132 to effectively prevent the image sensor 132 from overheating due to absorbing excessive light energy.

In an embodiment, in response to the controller 140 determining that the sensing signal S2 and the image signal S1 are mismatched, the controller 140 sends a warning signal that the illumination module 100 is abnormal to notify the user that the operation of the illumination module 100 is abnormal. "Mismatch" here means, for example, that the image of the sensing signal S2 and the image of the image signal S1 are not negative images of each other (i.e., complementary images). In the embodiment, the warning signal includes at least one of a display signal, an audio signal, and a text message. The controller 140 can transmit a warning signal to a warning unit (e.g., a warning light, a buzzer, or a display) to remind the user that the illumination module 100 may be faulty.

In the embodiment, the illumination module 100 is an automotive headlight, and in response to the controller 140 determining that the sensing signal S2 and the image signal S1 are mismatched, the controller 140 turns off the illumination module 100, or turns off the adaptive driving beam function of the illumination module 100, or switches the illumination module 100 to a low beam mode. In this way, an erroneous high beam can be effectively prevented from irradiating on oncoming vehicles, thereby effectively improving driving safety.

In the embodiment, the controller 140 compares the sensing signal S2 and the image signal S1 in real time to monitor whether the illumination module 100 is operating normally. In this way, when the illumination module 100 is an automotive headlight, driving safety can be ensured at all times. In an embodiment, the controller 140 is configured to command the reflective light valve 120 to provide the effective light beam 114 with a test pattern when the illumination module 100 is turned on, and compare the sensing signal S2 and the image signal S1 to self-determine whether the illumination module 100 is normal. That is to say, every time the illumination module 100 is turned on, the controller 140 checks whether the illumination module 100 is operating normally, which can effectively ensure the correctness of illumination during subsequent use. In an embodiment, the test pattern may be black-and-white, a specific graphic, all black, all white, or other patterns.

Figure 2A:
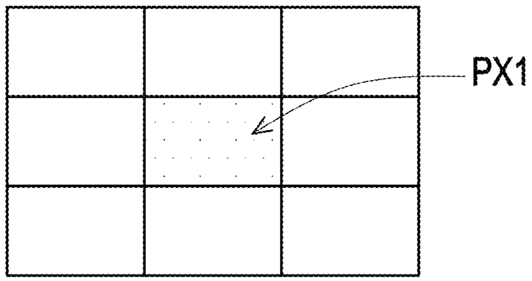
FIG. 2A is a schematic diagram of an image carried by the effective light beam of FIG. 1 having an error bright spot pixel
Figure 2B:
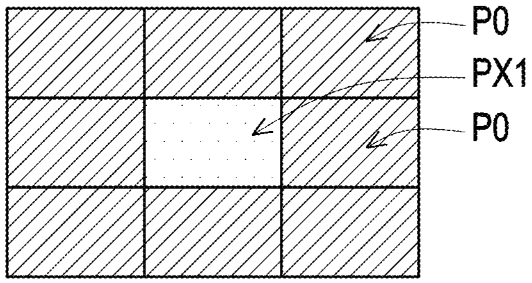
FIG. 2B to FIG. 2E are schematic diagrams illustrating that at least a portion of pixels around the error bright spot pixel in the image signal of FIG. 1 is changed into dark spot pixels.
Figure 2C:
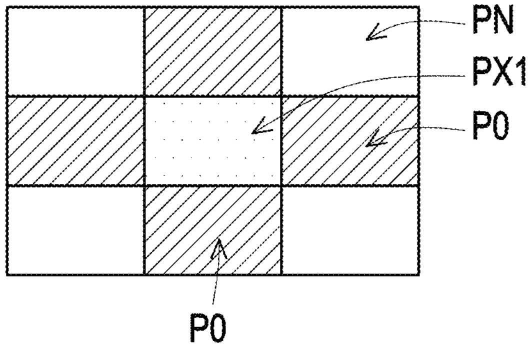
Figure 2D:
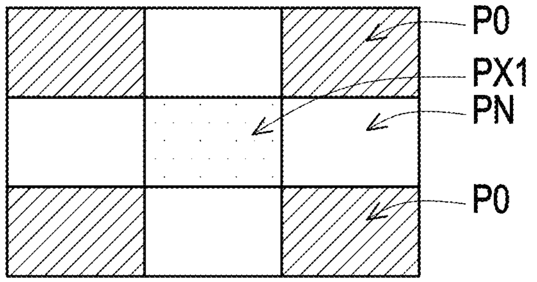
Figure 2E:
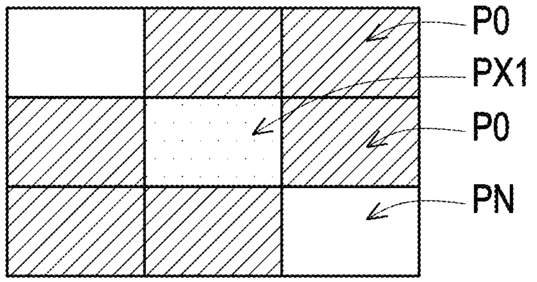

In an embodiment, in response to the controller 140 determining that the image (i.e., the image formed by the pixels 122 in the first state) carried by the effective light beam 114 has an error bright spot pixel PX1 by comparing the sensing signal S2 and the image signal S1 (as shown in FIG. 2A), the controller 140 changes at least a portion of the pixels around the error bright spot pixel PX1 in the image signal S1 into dark spot pixels P0 (as shown in FIG. 2B, FIG. 2C, FIG. 2D, or FIG. 2E). The other blank pixels PN in FIG. 2B to FIG. 2E mean that their grayscale values remain unchanged from the values in the original image signal S1. In this way, the surrounding dark spot pixels P0 can compensate for the error bright spot pixel PX1, so that such an error becomes less obvious. In FIG. 2B, all eight pixels around the error bright spot pixel PX1 are changed into dark spot pixels P0. In FIG. 2C, the four pixels located around to the top, bottom, left, and right of the error bright spot pixel PX1 are changed into dark spot pixels P0. In FIG. 2D, the four pixels in the four corners around the error bright spot pixel PX1 are changed into dark spot pixels P0. In FIG. 2E, the six pixels around the error bright spot pixel PX1 are changed into dark spot pixels P0. However, the disclosure is not limited to FIG. 2B to FIG. 2E. In other embodiments, other pixel combinations around the error bright spot pixel PX1 may also be changed into dark spot pixels P0.

Figure 3A:
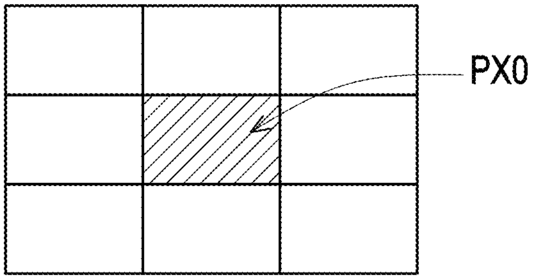
FIG. 3A is a schematic diagram of an image carried by the effective light beam of FIG. 1 having an error dark spot pixel.
Figure 3B:
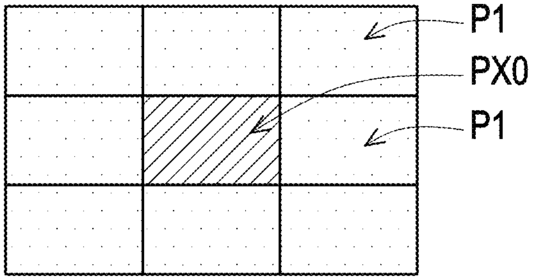
FIG. 3B to FIG. 3E are schematic diagrams illustrating that at least a portion of pixels around the error dark spot pixel is changed into bright spot pixels in the image signal of FIG. 1.
Figure 3C:
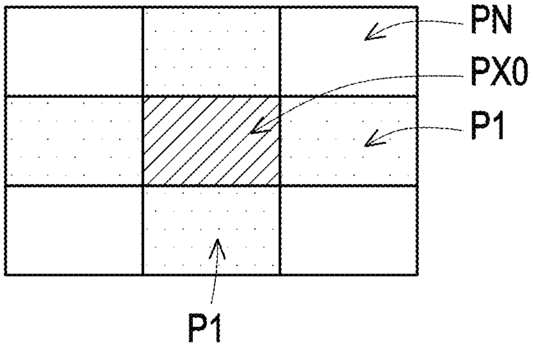
Figure 3D:
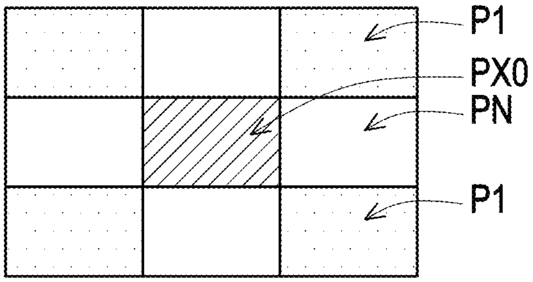
Figure 3E:
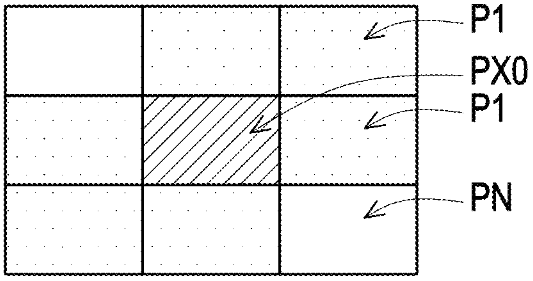

In an embodiment, in response to the controller 140 determining that the image (i.e., the image formed by the pixels 122 in the first state) carried by the effective light beam 114 has an error dark spot pixel PX0 by comparing the sensing signal S2 and the image signal S1 (as shown in FIG. 3A), the controller 140 changes at least a portion of the pixels around the error dark spot pixel PX0 in the image signal S1 into bright spot pixels P1 (as shown in FIG. 3B, FIG. 3C, FIG. 3D, or FIG. 3E). In this way, the surrounding bright spot pixels P1 can compensate for the error dark spot pixel PX0, so that such an error becomes less obvious. If the above-mentioned compensation of the bright and dark spots is combined with a projection lens with a diffusion function, the bright spots and the dark spots can be mixed together to achieve a better compensation effect. The above-mentioned FIG. 2A to FIG. 2E and FIG. 3A to FIG. 3E are illustrated with 9 pixels, but in actual applications, there may be more pixels.

Figure 4:
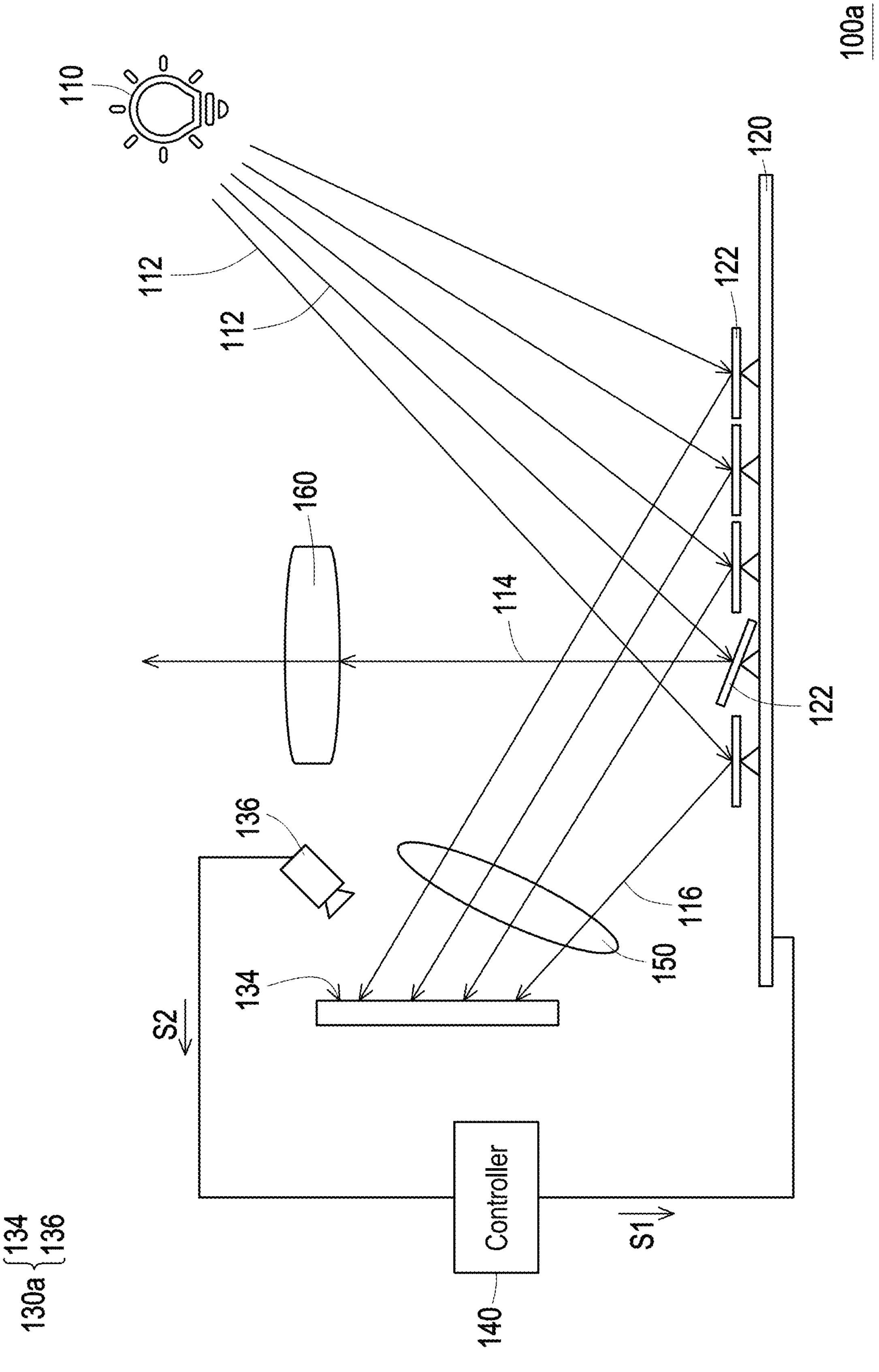
FIG. 4 is a schematic diagram of a light path of an illumination module according to another embodiment of the disclosure.

FIG. 4 is a schematic diagram of a light path of an illumination module according to another embodiment of the disclosure. Referring to FIG. 4, an illumination module 100*a* of the embodiment is similar to the illumination module 100 of FIG. 1, and the main differences between the two are as follows. In the illumination module 100*a* of the embodiment, an image sensing module 130*a* includes a reflective surface 134 and a camera 136. The reflective surface 134 is configured to receive the complementary light beam 116, and the camera 136 is configured to shoot towards the reflective surface 134. In the embodiment, the reflective surface is, for example, a diffuse reflective surface or a specular reflective surface, and the camera 136 shoots the complementary light beam 116 from the reflective surface 134 to obtain an image, and then converts the image into the sensing signal S2.

Figure 5:
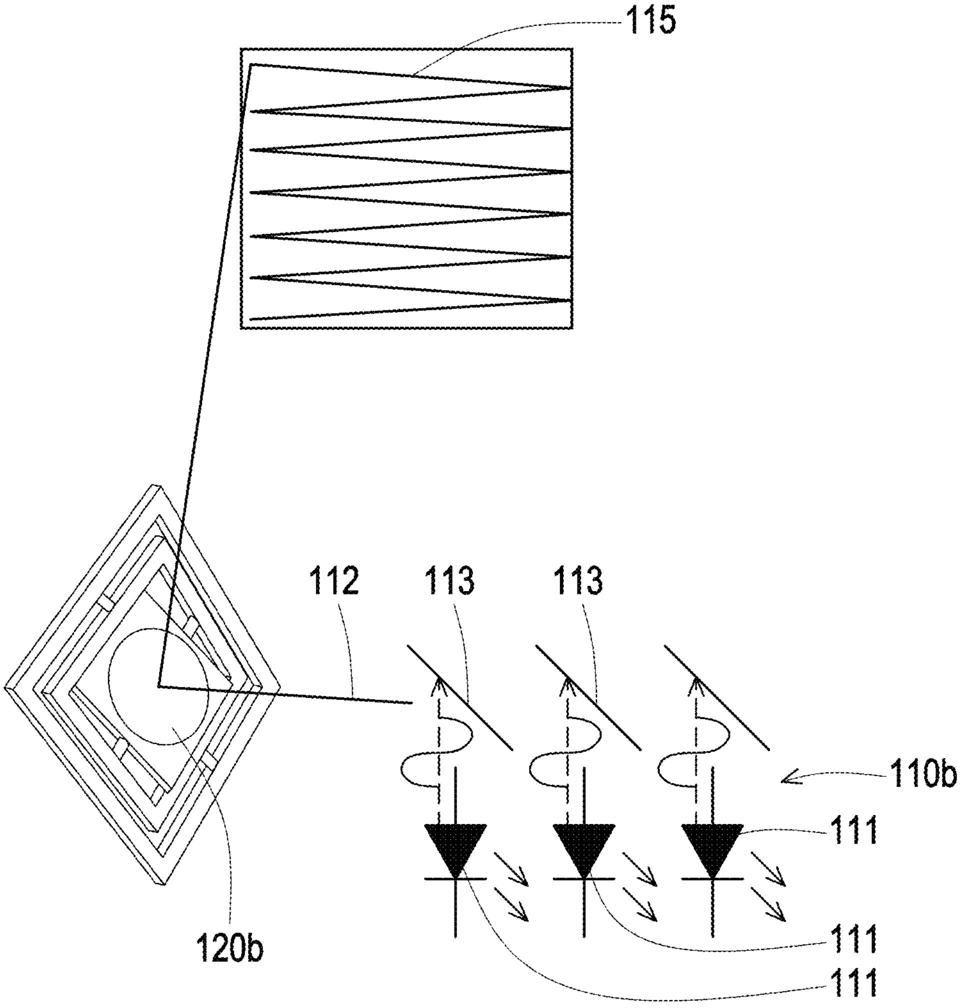
FIG. 5 is a schematic diagram of a light source and a reflective light valve according to another embodiment of the disclosure.

FIG. 5 is a schematic diagram of a light source and a reflective light valve according to another embodiment of the disclosure. Referring to FIG. 5, a light source 110*b* and a reflective light valve 120*b* of the embodiment can also be applied to the illumination module of FIG. 1 to replace the light source 110 and the reflective light valve 120 of FIG. 1. In the embodiment, the light source 110*b* is a laser diode group, which may include a plurality of laser diodes 111 of different colors (e.g., red, green, and blue laser diodes). The laser beams of different colors emitted by these laser diodes 111 can be combined by a dichroic 113 to form an illumination light beam 112. The reflective light valve 120*b* is a galvanometer adapted for swinging to scan the illumination light beam 112 into an image 115.

In the above-mentioned embodiments, the controller 140 is, for example, a central processing unit (CPU), a microprocessor, a digital signal processor (DSP), a programmable controller, a programmable logic device (PLD), or other similar devices, or a combination thereof, and the disclosure is not limited thereto. In addition, in an embodiment, each function of the controller 140 may be implemented as a plurality of program codes. These program codes will be stored in a memory, and the controller 140 will execute these program codes. Alternatively, in an embodiment, each function of controller 140 may be implemented as one or a plurality of circuits. The disclosure is not limited to using software or hardware to implement each function of the controller 140.

To sum up, in the illumination module of the embodiment of the disclosure, the controller determines whether the reflective light valve is operating normally by comparing the sensing signal corresponding to the complementary light beam and the image signal. Therefore, the illumination module of the embodiment of the disclosure can self-determine whether it is operating normally, thereby preventing the illumination module from projecting the effective light beam with a light distribution error. In an embodiment of the disclosure, the illumination module is, for example, an automotive headlight. Therefore, by allowing the illumination module to self-determine whether it is operating normally, the illumination module can be prevented from projecting the effective light beam with a light distribution error. For example, high beams can be effectively prevented from being erroneously projected onto oncoming vehicles, thereby effectively improving driving safety.

In another embodiment of the disclosure, the illumination module is, for example, a projector. Therefore, by allowing the illumination module to self-determine whether it is operating normally, the illumination module can be prevented from projecting the effective light beam with a light distribution error. That is, the illumination module can be effectively prevented from providing an erroneous image frame.

In an embodiment of the disclosure, a beam splitter or a light reducing mirror can be configured to reduce the light intensity of the complementary light beam irradiating the image sensor, thereby effectively preventing the image sensor from overheating due to absorbing excessive light energy.

In an embodiment of the disclosure, in response to the controller determining that the sensing signal and the image signal are mismatched, the controller sends a warning signal that the illumination module is abnormal to notify the user that the operation of the illumination module is abnormal.

In an embodiment of the disclosure, in response to the controller determining that the sensing signal and the image signal are mismatched, the controller turns off the illumination module, or turns off the adaptive driving beam function of the illumination module, or switches the illumination module to a low beam mode. In this way, an erroneous high beam can be effectively prevented from irradiating on oncoming vehicles, thereby effectively improving driving safety.

In an embodiment of the disclosure, the controller compares the sensing signal and the image signal in real time to monitor in real time whether the illumination module is operating normally. In an embodiment of the disclosure, when the illumination module is turned on, the controller can command the reflective light valve to provide the effective light beam with a test pattern, and compare the sensing signal and the image signal to self-determine whether the illumination module is normal.

In an embodiment of the disclosure, the controller 140 may change at least a portion of the pixels around the error bright spot pixel into dark spot pixels, or change at least a portion of the pixels around the error dark spot pixel into bright spot pixels to achieve a compensation effect.

What is claimed is:

1. An illumination module, comprising:

a light source, configured to emit an illumination light beam;

a reflective light valve, disposed on a path of the illumination light beam, and configured to form a plurality of pixels, wherein each pixel is adapted to be switched between a first state and a second state, the pixels in the first state among the pixels are configured to reflect the illumination light beam into an effective light beam, and the pixels in the second state among the pixels are configured to reflect the illumination light beam into a complementary light beam;

a lens, disposed on a path of the effective light beam, and configured to project the effective light beam to an area to be illuminated;

an image sensing module, disposed on a path of the complementary light beam from the reflective light valve, and configured to sense the complementary light beam and convert an image formed by the sensed complementary light beam into a sensing signal; and a controller, electrically connected to the reflective light valve and the image sensing module, wherein the controller is configured to provide an image signal to the reflective light valve to control a distribution of the first state and the second state of the pixels, and the controller is configured to determine whether the reflective light valve is operating normally by comparing the sensing signal and the image signal.

2. The illumination module according to claim 1, wherein the controller is configured to compare each first pixel data of the sensing signal and each second pixel data of the image signal, in response to the first pixel data and the second pixel data located at a same pixel position showing complementary grayscales, the controller is configured to determine that the reflective light valve is operating normally, and in response to the first pixel data and the second pixel data located at a same pixel position not showing complementary grayscales, the controller is configured to determine that the reflective light valve is not operating normally.

3. The illumination module according to claim 1, wherein the reflective light valve is a digital micro-mirror device, the pixels are respectively a plurality of micro-mirrors, a pixel in the first state represents that the micro-mirror of the pixel rotates to a first angle to reflect the illumination light beam irradiated thereon to the lens, and another pixel in the second state represents that the micro-mirror of the another pixel rotates to a second angle to reflect the illumination light beam irradiated thereon to the image sensing module.

4. The illumination module according to claim 1, wherein the light source comprises at least one of a light-emitting diode, a laser diode, and a gas discharge lamp.

5. The illumination module according to claim 1, wherein the light source is a laser diode group, and the reflective light valve is a galvanometer adapted for swinging.

6. The illumination module according to claim 1, wherein the illumination module is an automotive headlight.

7. The illumination module according to claim 1, wherein the illumination module is a projector.

8. The illumination module according to claim 1, wherein in response to the controller determining that the sensing signal and the image signal are mismatched, the controller sends a warning signal that the illumination module is abnormal.

9. The illumination module according to claim 8, wherein the warning signal comprises at least one of a display signal, a sound signal, and a text message.

10. The illumination module according to claim 8, wherein the illumination module is an automotive headlight, and in response to the controller determining that the sensing signal and the image signal are mismatched, the controller turns off the illumination module or switches the illumination module to low beam mode.

11. The illumination module according to claim 1, wherein in response to the controller determining that an image carried by the effective light beam has an error bright spot pixel by comparing the sensing signal and the image signal, the controller changes at least a portion of the pixels around the error bright spot pixel in the image signal into dark spot pixels.

12. The illumination module according to claim 1, wherein in response to the controller determining that an image carried by the effective light beam has an error dark spot pixel by comparing the sensing signal and the image signal, the controller changes at least a portion of the pixels around the error dark spot pixel in the image signal into bright spot pixels.

13. The illumination module according to claim 1, wherein the controller compares the sensing signal and the image signal in real time to monitor in real time whether the illumination module is operating normally.

14. The illumination module according to claim 1, wherein the controller is configured to command the reflective light valve to provide the effective light beam with a test pattern when the illumination module is turned on, and compare the sensing signal and the image signal to self-determine whether the illumination module is normal.

15. The illumination module according to claim 1, wherein the image sensing module is an image sensor.

16. The illumination module according to claim 1, wherein the image sensing module comprises:

a reflective surface, configured to receive the complementary light beam; and a camera, configured to shoot towards the reflective surface.

17. The illumination module according to claim 16, wherein the reflective surface is a diffuse reflective surface.

18. The illumination module according to claim 16, wherein the reflective surface is a specular reflective surface.

19. The illumination module according to claim 1, further comprising a lens group disposed between the reflective light valve and the image sensing module.

20. The illumination module according to claim 19, wherein the lens group comprises at least one of another lens, a beam splitter, and a light reducing mirror.

* * * * *